(12) United States Patent
Shah et al.

(10) Patent No.: US 11,473,167 B2
(45) Date of Patent: Oct. 18, 2022

(54) AUTOMATED DEVICE FOR DEGASSING AND/OR FOAMING OF METALS AND THEIR ALLOYS AND PROCESS THEREOF

(71) Applicants: Chirag Satish Shah, Ahmedabad (IN); Naresh Santoshkumar Jain, Ahmedabad (IN); Kedar Nitinbhai Bhojak, Ahmedabad (IN); Mohit Chhaganlal Bagmar, Ahmedabad (IN)

(72) Inventors: Chirag Satish Shah, Ahmedabad (IN); Naresh Santoshkumar Jain, Ahmedabad (IN); Kedar Nitinbhai Bhojak, Ahmedabad (IN); Mohit Chhaganlal Bagmar, Ahmedabad (IN)

(*) Notice: Subject to any disclaimer, the term of this patent is extended or adjusted under 35 U.S.C. 154(b) by 410 days.

(21) Appl. No.: 16/612,724

(22) PCT Filed: Oct. 3, 2017

(86) PCT No.: PCT/IN2017/050443
§ 371 (c)(1),
(2) Date: Nov. 11, 2019

(87) PCT Pub. No.: WO2018/207196
PCT Pub. Date: Nov. 15, 2018

(65) Prior Publication Data
US 2020/0165701 A1 May 28, 2020

(30) Foreign Application Priority Data
May 12, 2017 (IN) .............................. 201721016778

(51) Int. Cl.
*C22B 9/02* (2006.01)
*C22B 21/06* (2006.01)
*C22C 1/08* (2006.01)

(52) U.S. Cl.
CPC .............. *C22B 9/026* (2013.01); *C22B 21/06* (2013.01); *C22C 1/08* (2013.01); *C22C 2001/086* (2013.01)

(58) Field of Classification Search
CPC .. C22B 9/026; C22B 1/06; C22C 1/08; C22C 2001/086
See application file for complete search history.

(56) References Cited

U.S. PATENT DOCUMENTS

| 5,604,301 A | 2/1997 | Mountford et al. |
| 7,682,556 B2 | 3/2010 | Han et al. |
| (Continued) | | |

FOREIGN PATENT DOCUMENTS

| CN | 101234420 | 8/2008 |
| CN | 102145380 | 11/2012 |
| (Continued) | | |

OTHER PUBLICATIONS

International Search Report received in PCT/IN2017/050443, dated Feb. 13, 2018, 3 pages.

(Continued)

*Primary Examiner* — Scott R Kastler
(74) *Attorney, Agent, or Firm* — Klarquist Sparkman, LLP

(57) ABSTRACT

The present invention provides an automated device for degassing and/or foaming of metals and their alloys and process thereof. Said automated device for degassing and/or foaming of molten metals and their alloys and a process facilitates in controlled degassing and/or foaming of molten metals and thereby increases tensile strength, impact strength, hardness, malleability, corrosion resistance, conductivity of metals and their alloys and further eliminates the use of harmful chemicals and injectable gases in degasification of metal and alloys. Present automated device mainly (Continued)

comprises of plurality of sonic generator 1, controller 2, first assembly 3, second assembly 4, third assembly 5, fourth assembly 6. Said process comprises of steps including; 1. Selecting the mode of operation and setting parameters; 2. Activating said assemblies and facilitating Formation of ultrasonic cavitation in metal and their alloys; 3. Degassing of the molten metal and their alloys due to formation of micro bubbles.

4 Claims, 10 Drawing Sheets

(56) References Cited

U.S. PATENT DOCUMENTS

| | | | |
|---|---|---|---|
| 8,574,336 B2 | 11/2013 | Rundquist et al. | |
| 9,528,167 B2 | 12/2016 | Rundquist | |
| 2007/0235159 A1* | 10/2007 | Han | B22D 1/00 164/71.1 |
| 2011/0262766 A1* | 10/2011 | Babcsanl | B22D 27/08 164/71.1 |
| 2012/0042751 A1* | 2/2012 | Rundquist | B22D 1/002 75/646 |
| 2014/0238197 A1* | 8/2014 | Sammy | C22B 21/06 75/585 |
| 2020/0165701 A1* | 5/2020 | Shah | C22C 21/00 |
| 2022/0048105 A1* | 2/2022 | Han | B22D 1/002 |

FOREIGN PATENT DOCUMENTS

| | | |
|---|---|---|
| EP | 1238715 | 9/2002 |
| IN | 3176/MUM/2013 | 7/2015 |
| WO | WO 86/06749 | 11/1986 |
| WO | WO 2016/107941 | 7/2016 |
| WO | WO 2017044769 | 3/2017 |

OTHER PUBLICATIONS

Written Opinion, received in PCT/IN2017/050443, dated Feb. 13, 2018, 5 pages.
First Examination Report, received in counterpart India Patent Application No. 201721016778, dated Apr. 20, 2020, 6 pages.
Response to the First Examination Report, filed in counterpart India Patent Application No. 201721016778, dated Oct. 13, 2020, 178 pages.
Reply to communication pursuant to Rule 161(2) and 162 EPC, filed in counterpart European Application No. 17791446.0, dated Aug. 3, 2020, 90 pages.
"Basic Elements of MMM Systems & How MMM Systems Operate," MPInterconsulting, www.mpi-ultrasonics.com, May 2006, 39 pages.

* cited by examiner

AUTOMATED DEVICE FOR DEGASSING AND/OR FOAMING OF METALS AND THEIR ALLOYS AND PROCESS THEREOF

CROSS REFERENCE TO RELATED APPLICATIONS

This is the U.S. National Stage of International Application No. PCT/IN2017/050443, filed Oct. 3, 2017, which was published in English under PCT Article 21(2), which in turn claims the benefit of India Patent Application No. 201721016778, filed May 12, 2017. Both applications are hereby incorporated herein in their entirety.

FIELD OF INVENTION

The present invention provides an automated device for degassing and/or foaming of metals and their alloys and process thereof. In particular the present invention provides an automated device for degassing and/or foaming of molten metals and their alloys and a process which facilitates controlled degassing and/or foaming of molten metals and thereby increases tensile strength, impact strength, hardness, malleability, corrosion resistance, conductivity of metals and their alloys. Further, said invention eliminates the use of harmful chemicals and injectable gases in the process of degassing and/or foaming of metals and thus is environmentally friendly. The present invention requires less utilities, less power consumption and is easy and safe to operate, thus being efficient and cost-effective.

BACKGROUND OF INVENTION

Degassing is the process of removal of gases from liquid. Upon melting of a material, particularly a metal, it is most often necessary to remove impurities. Degassing in molten metals and their alloys is aimed to remove the hydrogen and other gases dissolved in the melt. Such dissolved gases in the melt have adverse effects on mechanical and physical properties of the metals and their alloys upon solidification.

It is therefore important in the casting processes of metals and their alloys to remove such dissolved gases and particulate impurities from the molten metals and their alloys before being cast. For example, in the case of aluminum, it is well known that molten aluminum at the outlet of the furnace, contains impurities in the form of alkali metals such as sodium, lithium, hydrogen, and foreign inclusions of various kinds. The presence of these impurities in aluminum in the solid phase in the form of coins or injected or molded blocks creates a lack of homogeneity of the material and significantly alters its physical qualities. Further in the case of copper wire typically made by drawing down copper rod that has been rolled from a continuously cast copper bar, the gas that is not removed from the copper prior to casting results in voids that increase the difficulty of satisfactorily drawing the wire and/or that lead to more wire breakage. Particulate impurities that are not removed prior to casting may also increase the difficulty of drawing the wire, decrease conductivity and ductility, and increase wire breakage.

Degassing and filtering techniques for various molten metals and their alloys are known in the art, but each of the known techniques is believed to have certain shortcomings. Many types of degasification and foaming methods are currently in use with the aid of various chemicals in gaseous, liquefied or solidified powdered forms. Various methods of degasification of molten metal includes ultrasonic degassing, vacuum degassing, rotary degassing and many more. Most of the existing methods use argon, nitrogen, chlorine, fluorine and other harmful chemicals to remove air, dissolved gases, salts, impurities and inclusions from metals and their alloys while they are in a molten state. Furthermore, various grain refiners along with harmful chemical ingredients such as halide-based fluxes are also used to accelerate the grain refinement process.

There are many challenges associated with the degassing of molten metals and their alloys wherein the first major challenge associated with producing metals and their alloys is reduction of the porosities that appear upon solidification of the metals and their alloys from their molten state. These porosities take place due to the presence of dissolved gases within metals and their alloys while they are in molten state. Degassing is employed for removal of such dissolved gases from molten metals and their alloys. The limited efficiency of degassing methods that are currently in use results in the presence of such porosities within solidified metals and their alloys, even after carrying out a degassing operation. The presence of such porosities generates unfavorable effects on metallurgical, mechanical, thermal and electrical properties of metals and their alloys. To counter the challenge of removal of such dissolved gases, precipitation to reduce the porosities the degassing is carried out using various conventional methods as mentioned below:

Using a trial and error method for combination of alkaline and inert gases in an injection-based rotary degassing process, either with normal atmospheric pressure conditions or with presence of a vacuum during molten state of metals and their alloys.

Using inert gases in an injection-based rotary degassing process, either with normal atmospheric pressure conditions or with presence of a vacuum during molten state of metals and their alloys.

Another challenge associated with metals and their alloys is removing impurities of Calcium, Magnesium and other elements of the earth either as lumps or inclusions from them during their molten state. The conventional solution to said challenge is provided by injecting the halides and fluxes into the molten state of metals and their alloys to achieve their purification through formation of salts as slag and dross. Industries using such harmful chemicals and injectable gases pollute the environment by releasing such harmful gases in the environment. Further the harmful chemicals used in the process pose danger to the health of the workers and the environment. Dealing with these requires additional caution and actions which is cumbersome and involves extra cost. It also increases the overall maintenance cost of the industry.

Yet another major challenge associated with metals and their alloys is to refine the grain sizes upon their solidification. The challenge conventionally is provided by the addition of grain refiners and fluxes during the molten state of metals and their alloys to achieve the objective of refinement. Also the challenge is to provide equi axial grain distribution in the molten metal state which the conventional methods fails to provide.

Yet another challenge in using the conventional molten metal degassing techniques is that it is known to apply varying degrees of vacuum to the molten metals and their alloys to suction or vacuum gas impurities out of the metals and their alloys. Said techniques for applying relatively high vacuum necessitate expensive and complicated vessels for holding the metal being vacuumed so that excessive ambient air does not inadvertently leak into the vessel. High vacuum has also tended to be associated with batch processing of molten metals and their alloys. It is difficult to subject a continuous flow of molten metals and their alloys to a high vacuum because the vacuum tends to work against the molten metals and their alloys flow. Low vacuum, on the other hand, tends to be of less benefit. It may also be desirable to protect the free surface of the molten metals and their alloys with a gaseous atmosphere having a particular composition. The difficulty of doing this can be increased if the protective atmosphere must be maintained at a pressure below ambient atmospheric pressure (e.g., as part of a system for subjecting the molten metals and their alloys to the vacuum conditions mentioned above). Any leakage into the system contaminates the protective atmosphere. And if the entire protective atmosphere must be maintained at a vacuum, the vacuum system may have to handle a relatively large volume of gas, which increases the expense of providing and operating the vacuum. Thus, the problems and challenges associated with the conventional molten metal degassing techniques can be summarized as follows:

Reduction in porosities without using inert gases.
Equal distribution of grains.
Removal of impurities.
Grain refinement upon solidification of metals.

Prior Art and its Disadvantages

3176/MUM/2013 relates to a system to develop, analyze and optimize the ultrasonic technology which includes analysis and optimization of metallurgical and thermal behavior of molten alloyed aluminum for ultrasonic degassing process for direct chilled castings of aerospace aluminum alloys.

However, said prior art relates to a system to develop, analyze and optimize the ultrasonic technique that includes analysis of metallurgical and thermal behavior of molten aluminum alloy and fails to provide the process of degassing and foaming of molten metal alloys. It only provides a single finger horn connected to a booster, which carries only a 500 kg per hour flow rate of the molten metal and thereby fails to provide a device and process that facilitates continuous degassing and foaming of molten metal alloys. Also it fails to provide requisite mechanisms that are essential to accommodate the irregular and larger flow rates of molten metals and their alloys in a stipulated time period. Further the said prior art uses high intensity ultrasound for the process of degassing of the molten aluminum metal which leads to premature bursting of cavitation bubbles, which results in less effective degassing. Also, it accelerates the rate of erosion of horn material due to the collapse of cavitation bubbles in the vicinity of dipped horns.

EP0224499 (A1) relates to a method that enables one to carry out the degassing of a melting material, particularly non-ferrous metals and aluminum, by subjecting the melting material to ultrasonic emissions. The melting material (3) flows into a transfer channel (2) from an oven (1) to a foundry (4). The ultrasound emitting device comprises a plurality of ultrasonic heads (5) mounted in the side walls and the bottom of the transfer channel. The ultrasonic heads (5) are connected to an adjustable ultrasound generator (6).

However, the cited prior art fails to provide the requisite mechanism for degassing and foaming of molten metals and thus is not efficient. Further the position of the ultrasonic heads in the prior art is kept within/on the side walls and bottom of the transfer channels and thereby it is not in contact with the flow of the molten metals and thus fails to provide efficient degassing of the molten metals. It fails to provide cooling to the device for the continuous mass production.

CN101234420A relates to an ultrasonic compression forming casting method and a special equipment thereof, which solves the problems of non-ideal vibration degassing effects and blowhole defects in a casting. The method provided by the invention is realized by the following steps: the configured materials are melted and overheated, and then the liquid molten metal is processed by degassing. A casting concave die is preheated, and the degassed liquid molten metal is quickly poured on the preheated concave die. High-energy ultrasonic waves and pressure are imposed on the liquid molten metal in the concave die to obtain an extrusion molding part provided with even and fine equi axed grain structures. The special equipment to implement the above ultrasonic wave compression forming casting method consists of a worktable provided with a casting concave die, which is special in that a holding furnace is arranged on the worktable; the casting concave die is positioned inside the holding furnace. The upper part of the casting concave die is provided with an ultrasonic transducer, and an amplitude transformer is arranged on the lower part of the ultrasonic transducer, and finally, an ultrasonic vibration rod used as a head is arranged on the lower part of the amplitude transformer.

However, said prior art uses high energy ultrasound waves and external pressure for compressing mold casting, and therefore it is not energy efficient. It fails to eliminate the use of harmful chemical gases such as HS-C. Also, the said prior art does not provide a system with continuous and mass production. It does not use specific irradiators for degassing of metal. Also, more time is taken for the degassing of metals. It is unable to provide a system that facilitates equi-axial distribution of grains in the molten metals. Further, it fails to increase the strength, conductivity, hardness of the metal. The said prior art requires high intensity ultrasound waves and high pressure, also requires preheating of the mold and thus is not energy efficient process. Also, the prior art does not facilitate the bubble cavitation and thus fails to provide an efficient process for degassing and foaming of the molten metals.

U.S. Pat. No. 7,682,556 B2 relates to an apparatus and method in which ultrasonic vibration is used to assist the degassing of molten metals or metal alloys thereby reducing gas content in the molten metals or alloys. High-intensity ultrasonic vibration is applied to a radiator that creates cavitation bubbles, induces acoustic streaming in the melt, and breaks up purge gas (e.g., argon or nitrogen), which is intentionally introduced in a small amount into the melt in order to collect the cavitation bubbles and to make the cavitation bubbles survive in the melt. The molten metal or alloy in one version of the invention is an aluminum alloy. The ultrasonic vibrations create cavitation bubbles and break up the large purge gas bubbles into small bubbles and disperse the bubbles in the molten metal or alloy more uniformly, resulting in a fast and clean degassing.

However, said prior art fails to eliminate the use of harmful chemical gases such as argon, nitrogen, and chlorine. Also, the said prior art fails to provide a system with continuous and mass production. It fails to provide use of specific levitators. Further it does not provide equi axial alloys distribution with equi axed grains shape.

Disadvantages of Prior Art

The inventions mentioned in the prior art suffer from all/any of the below mentioned disadvantages:
- Most of them fail to provide an automated device for degassing and/or foaming of molten metals and alloys.
- They do not provide controlled degassing of molten metals and their alloys.
- They provide only degassing of molten metal; however, none of them facilitates foaming of metal.
- They fail to provide controlled improvement of properties of metals such as tensile strength, impact strength, hardness, malleability, corrosion resistance, erosion resistance and conductivity of metals and their alloys up to the desired level.
- The industry has no option other than to use existing prior art that uses harmful chemicals and injectable gases such as fluorine, chlorine, nitrogen, argon and alike chemicals including their compounds and solutions either in aqueous or in non-aqueous, gaseous, solid and powdered form. It in turn releases harmful gases into the environment, which possess the threat to the environment and the health of the workers working in the industry. Thus, most of them are unsafe as well as not environmentally friendly.
- The use of harmful chemicals and injectable gases in the prior art calls for significantly higher cost of chemicals and maintenance of the surrounding environment, and thus the prior art is not cost effective.
- They are unable to eliminate the use of a heater and thus utilize more power consumption, which thus does not provide an energy efficient device and process for degassing of molten metals.
- None of them provide porosities level to nil and/or up to the desired level in the molten melt and hence do not provide an efficient device and process for degassing of molten metals.
- They fail to provide equi axial alloys distribution with an equi axed grains shape and thereby fail to enhance the quality and strength of the metal and thus fail to provide an efficient system.
- They do not provide grain refinement.
- They are unable to provide a system that regulates and controls the frequency and amplitude of the ultra-sonic waves generated for the degassing of the molten metals and thus fail to provide an efficient and user-friendly device and process for degassing of molten metals.
- They are unable to provide a system that reduces the level of porosities in the metal upon solidification of the metal and thus do not provide an efficient device and process for degassing of the molten metals.
- They are unable to provide a process for degassing and/or foaming of metals and their alloys through formation of sonic cavitation and thus are not effective and efficient.
- None of them facilitate the creation of bubble cavitation and thus are unable to provide an efficient process for degassing and foaming of the molten metals.
- They fail to provide continuous and mass production metal and their alloys.
- They do not provide increased shelf life of the device.
- Most of them are not user friendly.
- They are not efficient.
- They do not to provide an environmentally friendly system.
- Most of them are not cost effective.
- They fail to provide a system with minimal maintenance cost.

Therefore, there is an unmet need to come up with the invention that eliminates the disadvantages of prior art.

OBJECTS OF INVENTION

The primary object of the present invention is to provide an automated device for degassing and/or foaming of metals and their alloys.

Another object of the present invention is to provide an automated device for degassing and/or foaming of metals and their alloys, that regulates and controls the frequency and amplitude of the ultra-sonic waves generated for the degassing of the molten metals.

Another object of the present invention is to provide an automated device for degassing and/or foaming of metals and their alloys that facilitates continuous and mass production of metal and their alloys.

Another object of the present invention is to provide an automated process for degassing and/or foaming of molten metals and their alloys. Another object of the present invention is to provide an automated process for degassing and/or foaming of molten metals and their alloys that facilitates the creation of bubble cavitation and thus provides an efficient process for degassing and foaming of the molten metals and their alloys.

Another object of the present invention is to provide an automated/controlled process for degassing and/or foaming of molten metals and their alloys that facilitates controlled degassing and/or foaming of molten metals and thereby increases tensile strength, impact strength, hardness, malleability, corrosion resistance, and conductivity of metals and their alloys.

Another object of the present invention is to provide an automated/controlled process for degassing and/or foaming of molten metals and their alloys that reduces the porosities level to nil and/or up to the desired level in the molten metals and their alloys.

Another object of the present invention is to provide an automated/controlled process for degassing and/or foaming of molten metals and their alloys that provides equi axial alloys distribution with equi axed grains shape and thereby enhances the quality and strength of the metal.

Another object of the present invention is to provide an automated/controlled process for degassing and/or foaming of molten metals that eliminates the use of injectable and harmful chemicals such as fluorine, chlorine, nitrogen, argon and chemicals including their compounds and solutions either in aqueous or in non-aqueous, gaseous, solid and powdered form.

Another object of the present invention is to provide an automated/controlled process for degassing and/or foaming of molten metals that provides grain refinement of the metals and their alloys.

Another object of the present invention is to provide an automated/controlled process for degassing and/or foaming of molten metals that facilitates removal of solid inclusions in the metals and their alloys.

Another object of the present invention is to provide an automated/controlled process for degassing and/or foaming of molten metals that reduces the porosities in the metal and their alloys upon solidification.

Another object of the present invention is to provide an automated/controlled process for degassing and/or foaming of molten metals which operates efficiently at reduced atmospheric conditions and with reduced energy.

Another object of the present invention is to provide an automated device for degassing and/or foaming of metals and their alloys, that increases the shelf life of the device.

Another object of the present invention is to provide an automated/controlled process for degassing and/or foaming of molten metals that is user friendly.

Another object of the present invention is to provide an automated/controlled process for degassing and/or foaming of molten metals that is safe for users.

Another object of the present invention is to provide an automated/controlled process for degassing and/or foaming of molten metals that utilizes less energy and thus is energy efficient and environmentally friendly.

Another object of the present invention is to provide an automated/controlled process for degassing and/or foaming of molten metals that is cost effective.

Another object of the present invention is to provide an automated/controlled process for degassing and/or foaming of molten metals that has minimal maintenance cost.

Another object of the present invention is to provide an automated device for degassing and/or foaming of molten metals and a process that obviates the problems of the prior art.

BRIEF DESCRIPTION OF DRAWINGS

Figure 1:
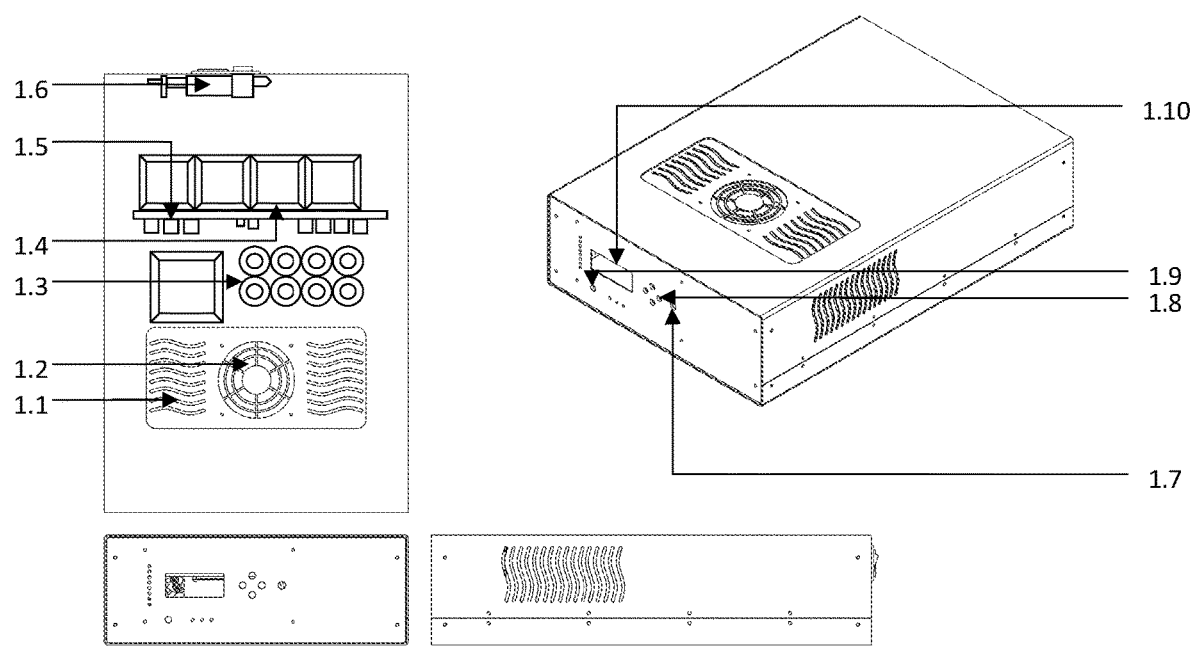
Figure 2:
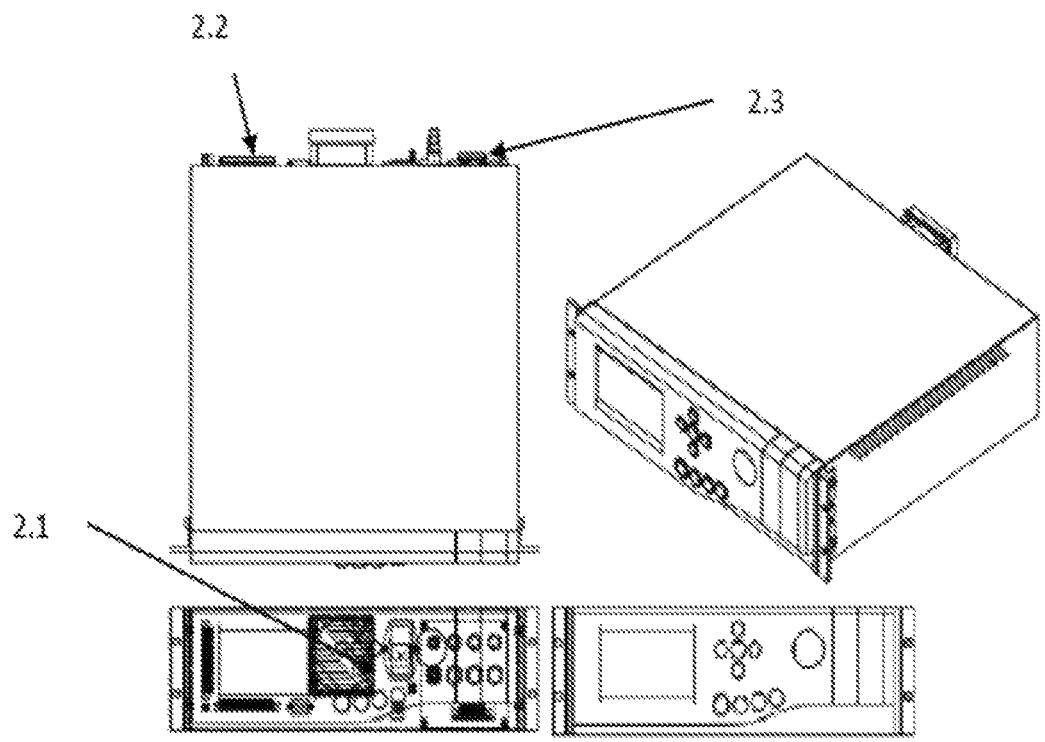
Figure 3:
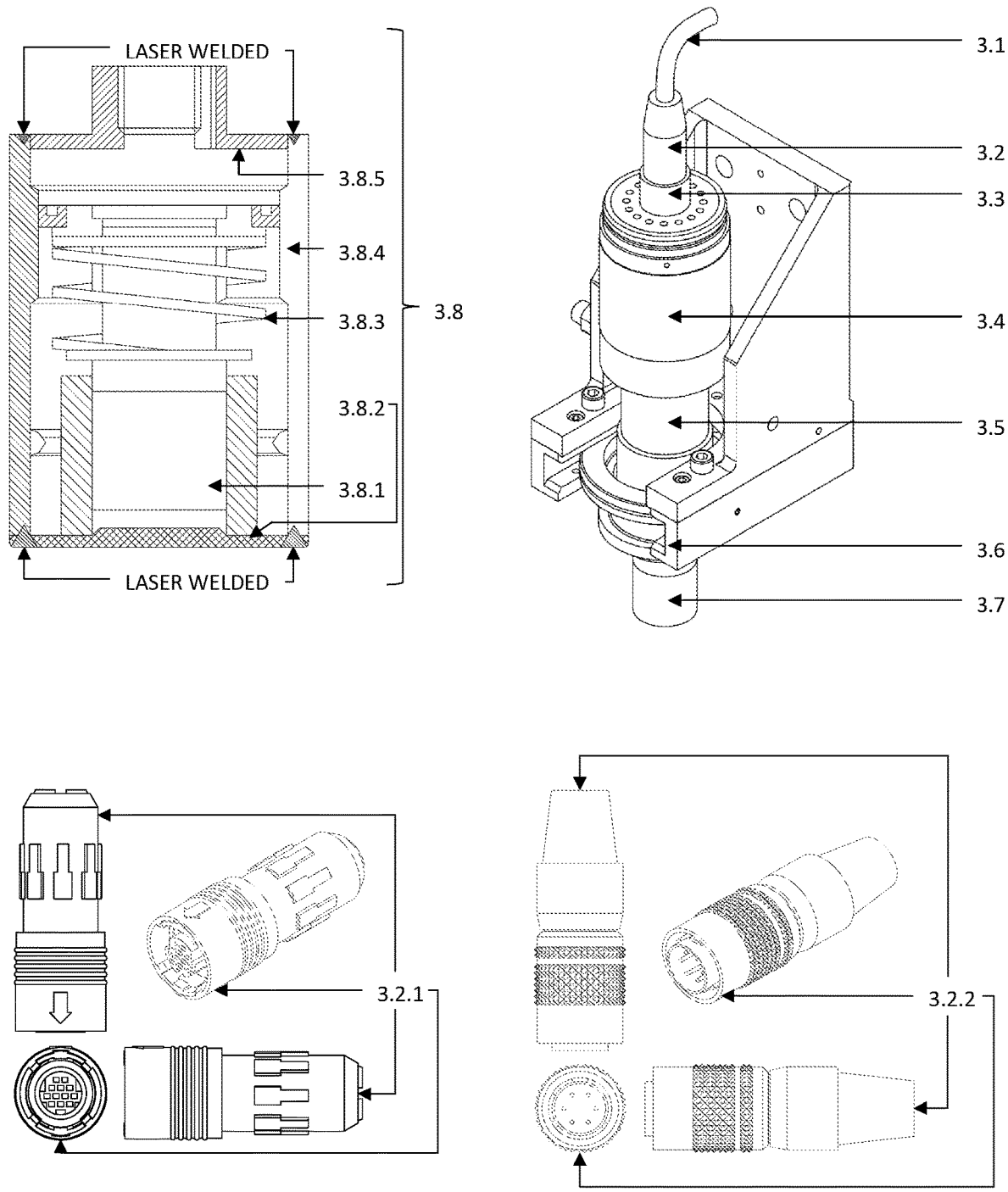
Figure 4:
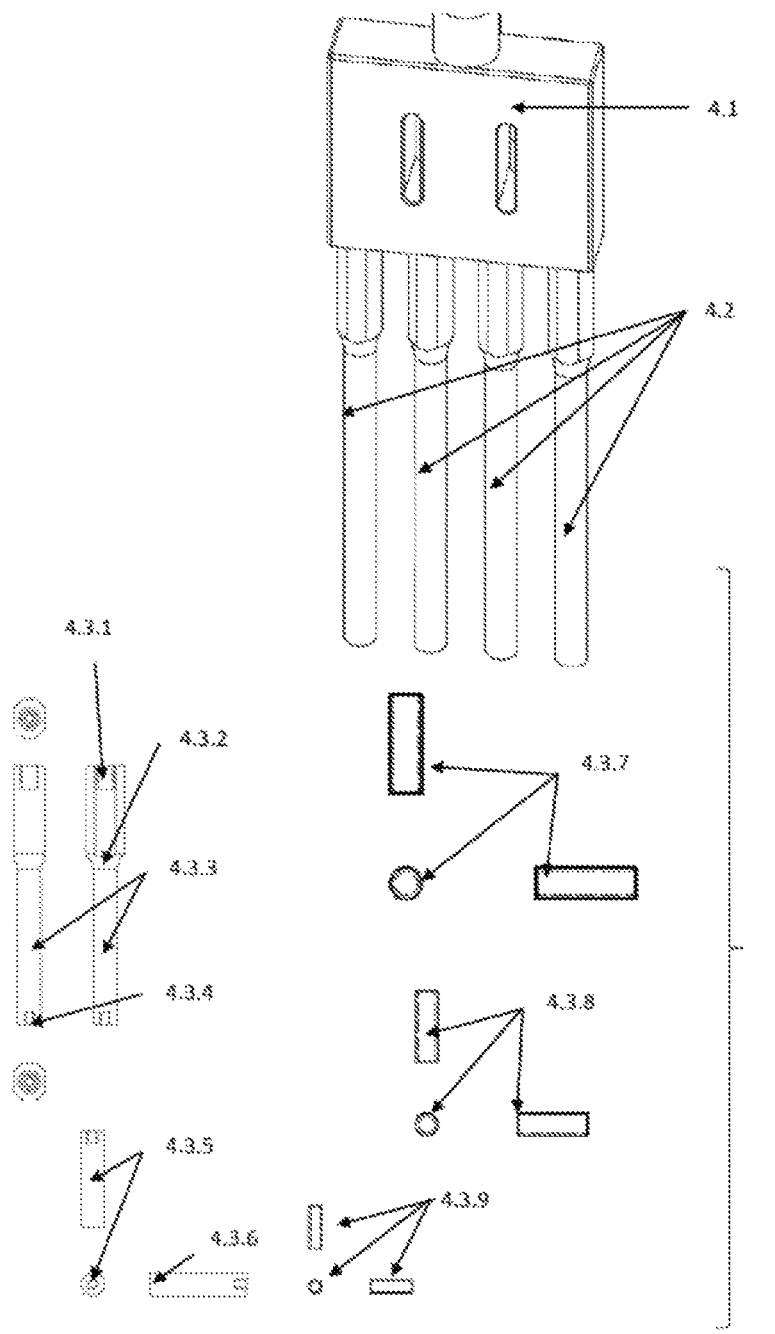
Figure 5:
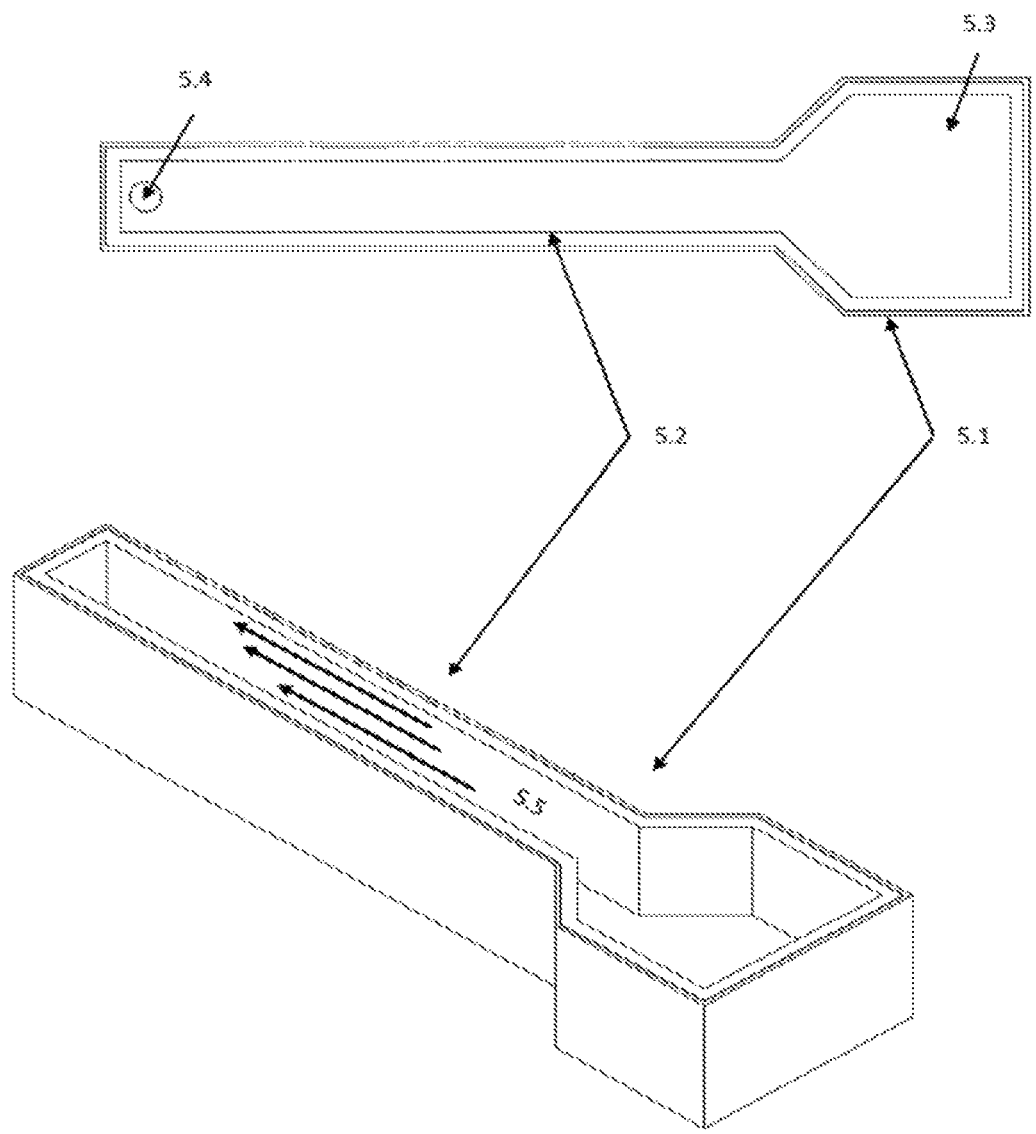
Figure 6:
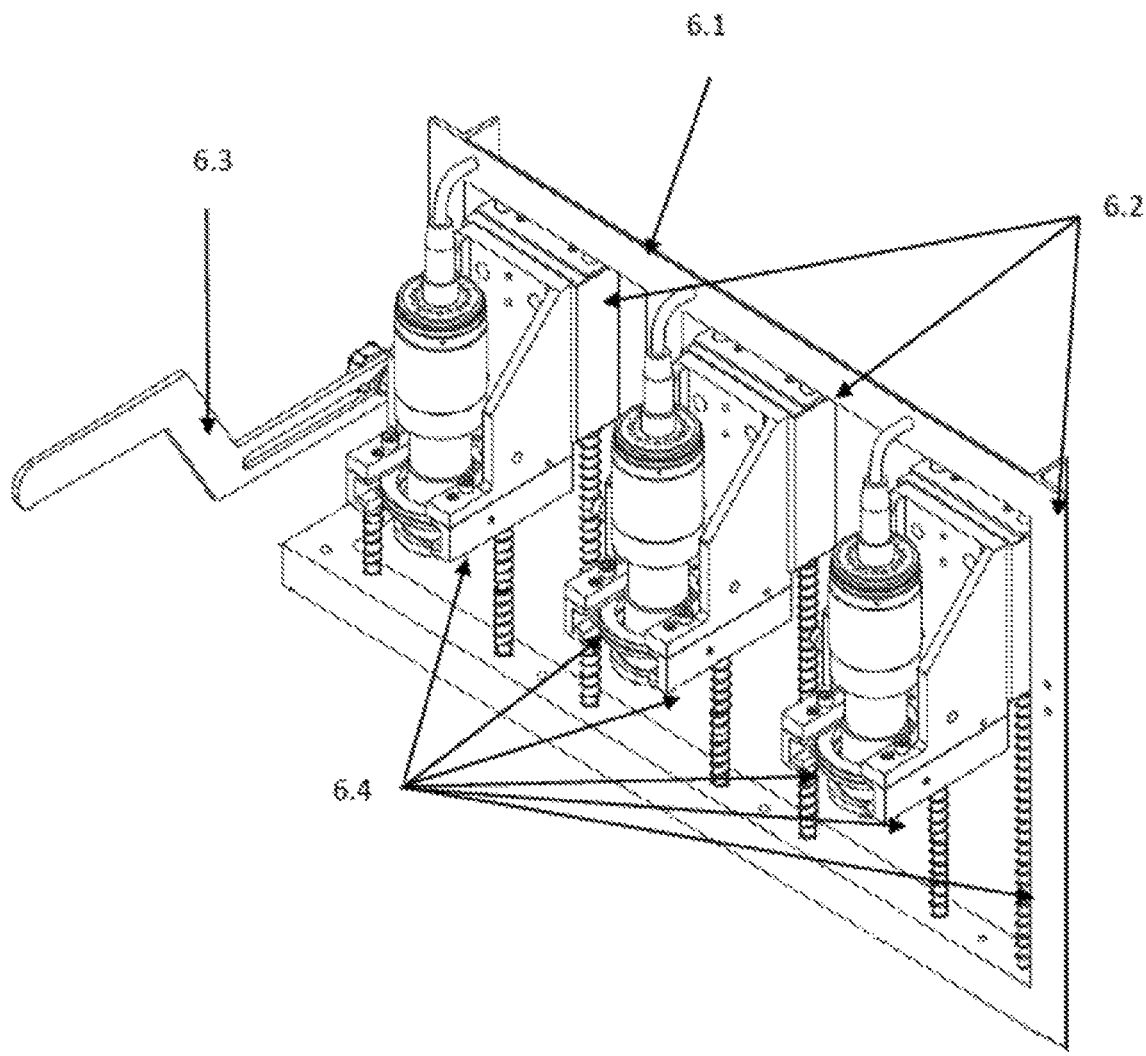
Figure 7:
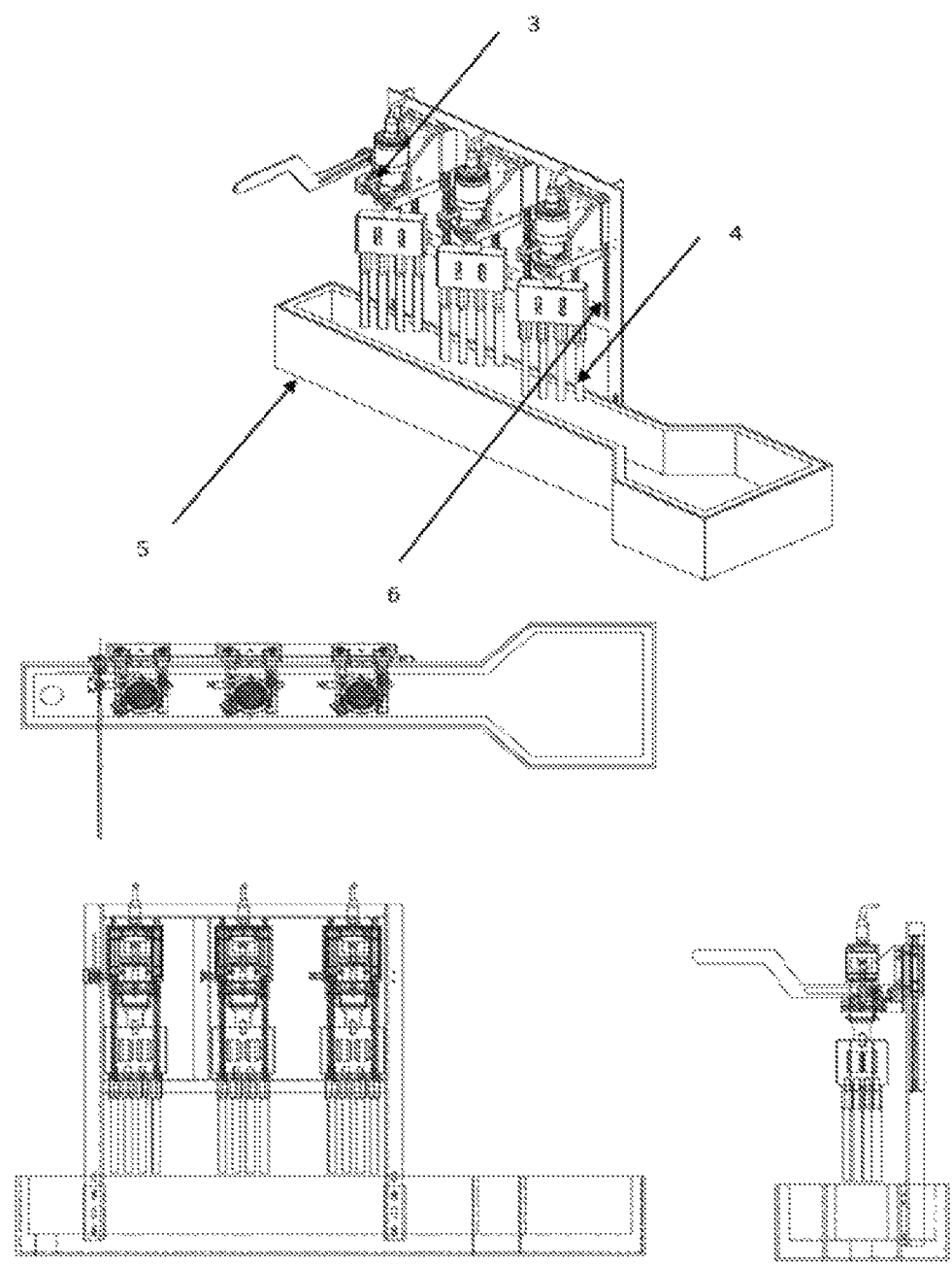
Figure 8:
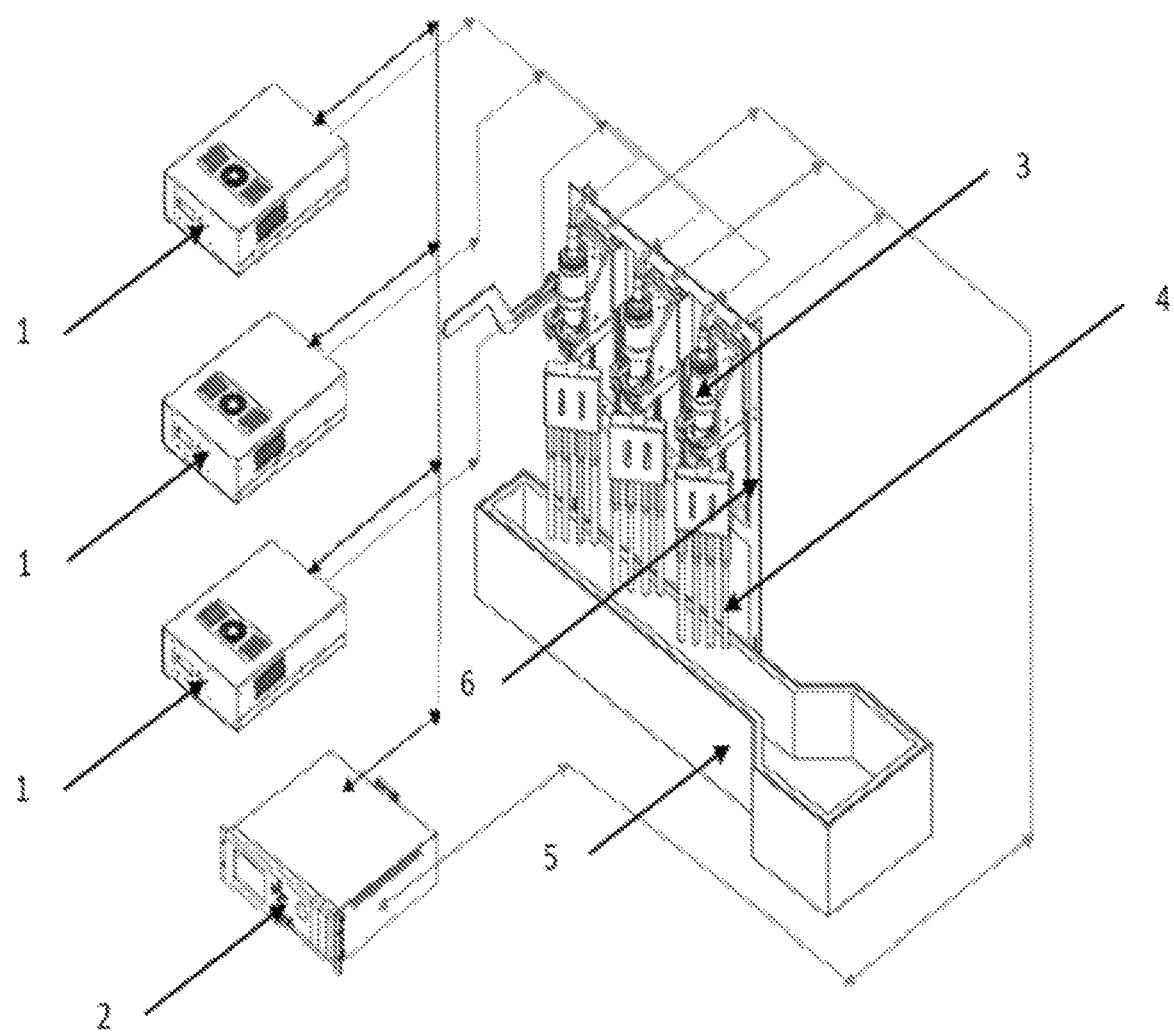
Figure 9:
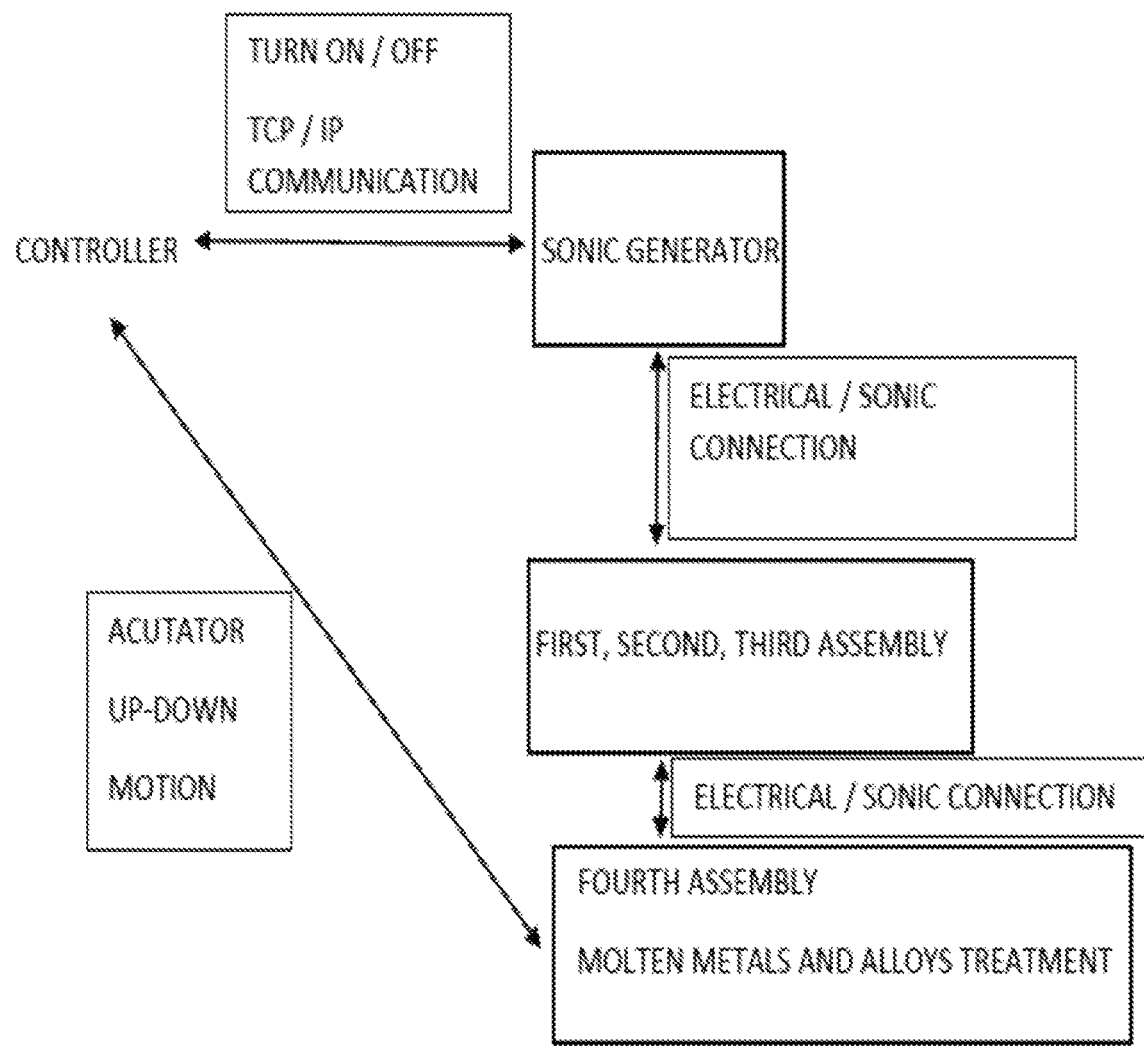
Figure 10:
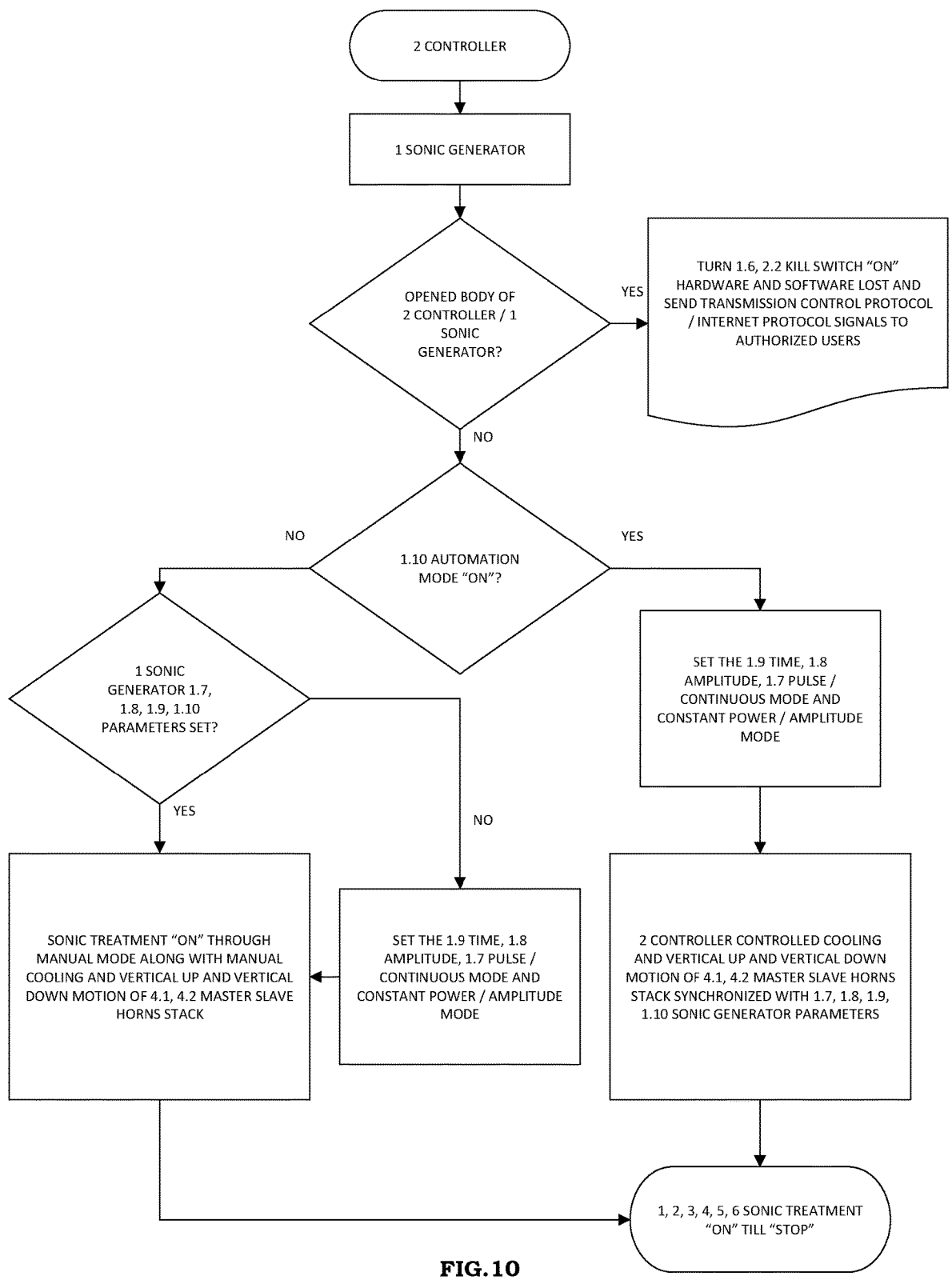

| BRIEF DESCRIPTION OF DRAWINGS: | |
|---|---|
| FIG. 1 | Shows perspective view of Sonic Generator of the present Automatic Device For Degassing And/or Foaming Of Metals And Their Alloys And Process Thereof. |
| FIG. 2 | Shows the Controller of the present Automatic Device For Degassing And/or Foaming Of Metals And Their Alloys And Process Thereof. |
| FIG. 3 | Shows the fragmented view of First Assembly of the present Automatic Device For Degassing And/or Foaming Of Metals And Their Alloys And Process Thereof. |
| FIG. 4 | Shows the fragmented view of Second Assembly of the present Automatic Device For Degassing And/or Foaming Of Metals And Their Alloys And Process Thereof. |
| FIG. 5 | Shows the fragmented view of third Assembly of the present Automatic Device For Degassing And/or Foaming Of Metals And Their Alloys And Process Thereof. |
| FIG. 6 | Shows the fragmented view of Fourth Assembly of the present Automatic Device For Degassing And/or Foaming Of Metals And Their Alloys And Process Thereof. |
| FIG. 7 | Shows the mechanical connections between the first, second, third and fourth assembly of the present Automatic Device For Degassing And/or Foaming Of Metals And Their Alloys And Process Thereof. |
| FIG. 8 | Shows the electrical and sonic waves connections between the first, second, third, fourth assembly of the present Automatic Device For Degassing And/or Foaming Of Metals And Their Alloys And Process Thereof. |
| FIG. 9 | Show the block diagram of controller of the present Automatic Device For Degassing And/or Foaming Of Metals And Their Alloys And Process Thereof. |
| FIG. 10 | Shows the working flow chart of the present Automatic Device For Degassing And/or Foaming Of Metals And Their Alloys And Process Thereof. |

DETAILED DESCRIPTION OF INVENTION

The embodiment of the present invention is to provide an automated device and process for degassing and/or foaming of molten metal and their alloys P; which provides automated and controlled degassing and/or foaming of molten metal alloys along with the continuous degassing of molten metal and their alloys. The present invention facilitates the removal of solid inclusions from the molten metal and provides equi-axial grain distribution, and grain refinement of the molten metal. The present invention further eliminates the use of harmful injectable chemicals in the process of degassing and\or foaming of molten metals.

The present automated device for degassing and\or foaming of molten metals P, mainly comprises:
A Plurality of Sonic Generators,
Controller,
First Assembly,
Second Assembly,
Third Assembly,
Fourth Assembly.
Wherein:

MEANING OF REFERENCE NUMERALS OF COMPONENT PARTS OF PRESENT INVENTION

P: Present automatic device for degassing and/or foaming of molten metal and alloys and process thereof.
1: Plurality of Sonic Generators
1.1: Cooling Fins
1.2: Cooling Fan
1.3: Capacitor and resistor Array
1.4: Frequency transformers
1.5: Logic Gates array
1.6: Kill switch
1.7: Frequency setting switch
1.8: Amplitude setting Switch
1.9: Time setting switch
1.10: Display
2: Controller
2.1: Connection to sonic Generator
2.2: Kill switch TCP/IP communication port
2.3: Connection to controller and Water Cooled Guide with Actuator for Up-Down Motion
3: First assembly
3.1: Connection to sonic generator through cable
3.2: Multi pin Rose Connecter (Male/female)
3.2.1: Multi Pin Rose Female connector
3.2.2: Multi Pin Rose Male Connector
3.3: Socket lock of multi Pin Rose Connector
3.4: Converter
3.5: Booster
3.6: Socket lock with cooling arrangement
3.7: Guide bush and boss
3.8: Enlarged view of 3.4 and 3.5
3.8.1: Piezo device
3.8.2: Membrane
3.8.3: Ceramic Spring
3.8.4: Housing for piezo ceramic parts
3.8.5: Cap
4: Second Assembly
4.1: Master Horns Stack
4.2: Split Tip slave Horns Stack
4.3: Enlarged view of 3.7, 4.1, 4.2
4.3.1: Connection to Master Horn Stack
4.3.2: Catenoidal exponential mixed stepped profile of slave horns stack
4.3.3: Top of Split tip Slave Horns Stack
4.3.4: Connection to bottom of split Slave horns stack
4.3.5: Bottom of Split slave horn stack 4.3.6: Connection to top of split slave horns stack
4.3.7: Connector to booster and master horns stack
4.3.8: Connector to master horn stack and split slave horn stack
4.3.9: Connector to split slave horns stack
5: Third Assembly
5.1: Launder body
5.2: Refractory lining
5.3: Inlet
5.4: Outlet
5.5: Direction of flow of molten metals and their alloys
6: Fourth assembly
6.1: Structural assembly
6.2: Actuator with water cooled guide
6.3: Arm
6.4: Spring with guide Referring to FIG. 1, the plurality of sonic generators 1 are provided for the generation of controlled resonance frequencies and for setting of amplitude and time and a given generator is connected to the controller 2 at one side and is connected to the first assembly 3, second assembly 4 and third assembly 5 on the other side of the present device P as shown in FIG. 9. Said plurality of sonic generators 1 further comprise:

Cooling Fins 1.1,
Cooling Fan 1.2,
Capacitor and resistor Array 1.3,
Frequency transformers 1.4,
Logic Gates array 1.5,
Kill switch 1.6,
Frequency setting switch 1.7,
Amplitude setting Switch 1.8,
Time setting switch 1.9, and
Display 1.10.

Said Cooling Fins 1.1 and Cooling fans 1.2 are provided for cooling of the said plurality of sonic generators 1, Said Frequency setting switch 1.7, Amplitude setting Switch 1.8 and Time setting switch 1.9 are provided to set the frequency, amplitude and time of the sonic waves generated. The set values of the frequency, amplitude and time are displayed on the display 1.10 of the sonic Generator 1. Capacitor and resistor Array 1.3, and Logic Gates array 1.5 made up of carbon, metal oxides are provided for controlling and automatic tuning of the electrical waves according to the set frequency, amplitude and time period. Further, Frequency transformers 1.4 are provided for the generation and transformation of stepped up frequency to the preset higher frequency into controlled electrical waves. Said plurality of sonic generators 1 is provided with protection; wherein physical protection is provided through the kill switch 1.6 and another protection is provided by controlled system. Said kill switch 1.6 is provided as a physical protection of the said plurality of sonic generators 1, wherein the kill switch 1.6 automatically turns "on" when the unauthorized user tries to open the said plurality of sonic generators 1.

Referring to FIG. 2, the controller 2 is provided for automatic control of the present automated device for degassing and\or foaming of molten metals and their alloys P. Said controller 2 is further comprises:

Connection to sonic Generator 2.1,
Kill switch TCP/IP communication port 2.2,
Connection to controller and Water Cooled Guide with Actuator for Up-Down Motion 2.3, Wherein:
Said controller 2 is connected to the plurality of sonic generators 1 through Connection to sonic Generator 2.1 by means of electrical and TCP/IP connections shown in FIG. 8 and FIG. 9. Said controller 2 is provided to perform the following functions that include (1) tripping of the plurality of sonic generators 1 on receiving the signals from Kill switch TCP/IP communication port 2.2 and (2) operating the present automated device for degassing and\or foaming of molten metals and their alloys P in manual or automated mode as per user selection. Said kill switch with TCP/IP communication port 2.2 alerts the authorized user of any hindrance caused by the unauthorized user that tries to open the parts of the said plurality of sonic generators 1 through TCP/IP. Further the said controller 2 regulates and controls the frequency, amplitude, and time set by the said plurality of sonic generators 1 and facilitates in the efficient tuning of the parameters required for the controlled degassing and/or foaming of molten metal and their alloys. Said controller 2 controls the automated mode of working of the present device for degassing and/or foaming of molten metal and their alloys P, which includes pulse mode, or continuous mode, sonic treatment, or constant amplitude mode, and varies according to user selection of batch wise production or continuous production; thereby providing the continuous degassing and/or foaming of molten metal and their alloys. Said controller 2 facilitates overload protection and frequency sweeping and thus increases the shelf life of the component parts and the device. The present automated device for degassing and/or foaming of molten metal and their alloys P eliminates the use of any heaters in the device and in turn provides for the cooling of the device without incurring the extra cost, thereby being energy efficient and cost effective. During continuous production, the device heats up and needs to be cooled down. In order to cool the present device P during the continuous production the controller 2 facilitates a closed loop control over water and air cooling of the said first Assembly 3 and second assembly 4. Connection to controller and Water Cooled Guide with Actuator for Up-Down Motion 2.3 is provided for protection against thermal shock erosion and hot corrosion.

Referring to FIG. 3, a first assembly 3 is provided for converting the said preset frequency, amplitude electrical waves into set frequency amplitude sonic waves and is connected to the said plurality of sonic generators 1 on one side and is connected to the fourth assembly 6 on the other side of the present device P as shown in FIG. 8 and FIG. 9. Said First assembly 3 is further comprised of;

Connection to sonic generator through cable 3.1,
Multi pin Rose Connecter (Male/female) 3.2,
Multi Pin Rose Female connector 3.2.1,
Multi Pin Rose Male Connector 3.2.2,
Socket lock of multi Pin Rose Connector 3.3,
Converter 3.4,
Booster 3.5,
Socket lock with cooling arrangement 3.6,
Guide bush and boss 3.7
Piezo device 3.8.1,
Membrane 3.8.2,
Ceramic Spring 3.8.3,
Housing 3.8.4,
Cap 3.8.5

Said first assembly 3 is connected to the plurality of sonic generators 1 through the connection to sonic generator cable 3.1. The multi pin rose connecter (male/female) 3.2 is provided for the secured connection of sonic generator cable 3.1 to the plurality of sonic generators 1 and booster 3.5 for transmission of set frequency along with set amplitude and further consists of multi pin rose female connector 3.2.1, multi pin rose male connector 3.2.2. The socket lock of multi pin rose connector 3.3 is provided to ensure the connection of multi pin rose connecter (male/female) 3.2. The converter 3.4 is provided for converting the set higher frequency along with set amplitude electrical waves into sonic waves with set higher frequency along with set amplitude and is connected to said plurality of sonic generators 1 on one side through said multi pin rose female connector 3.2.1 and connection to sonic generator cable 3.1 and is connected to booster 3.5 on other side. Said booster 3.5, is provided for boosting the sonic waves with set higher frequency along with set amplitude. Said converter 3.4 and booster 3.5 comprises of piezo electric ceramic elements for generating sonic waves from electrical waves. Socket lock with cooling arrangement 3.6 is provided for cooling of piezo device 3.8.1 and to prevent development of cracks formed due to heating. Said piezo device 3.8.1 is located inside said convertor 3.4 and booster 3.5. Guide bush and boss 3.7 is provided for mechanical strength to master horns stack 4.1. The membrane 3.8.2 is made up of the material including but not limiting to the use of silicon, phospher, bronze, metals, monel, metallic oxides and alike and is provided to transmit the expansions and contractions of piezo device 3.8.1 according to the set frequency and amplitude. Further ceramic spring 3.8.3 is provided to absorb for the shocks generated by the rapid expansions and contractions of said piezo device 3.8.1 according to the set frequency and amplitude. Said housing 3.8.4 provides mechanical protection to the said piezo device 3.8.1, membrane 3.8.2, and ceramic spring 3.8.3. Said housing 3.8.4 is a hollow thick cylinder of titanium alloy with cap 3.8.5 on top and bottom.

Referring to FIG. 4, the second assembly 4 is sonic master slave horn stack assembly and is provided for transmitting the sonic waves with set higher frequency along with set amplitude into molten metals and their alloys and is connected to said first assembly 3 on one side and is connected to the fourth assembly 6 on the other side of the present device P as shown in FIG. 9. Said second assembly comprises:

Master Horns Stack 4.1
Split Tip Slave Horns Stack 4.2,
Connection to Master Horn Stack 4.3.1
Catenoidal exponential mixed stepped profile of slave horns stack 4.3.2,
Top of Split Slave Horns Stack 4.3.3,
Connection to bottom of split Slave horns stack 4.3.4
Bottom of Split slave horn stack 4.3.5,
Connection to top of split slave horns stack 4.3.6,
Connector to booster and master horns stack 4.3.7,
Connector to master horn stack and split slave horn stack 4.3.8, and
Connector to split tip slave horns stack 4.3.9

The Split Tip slave Horns Stack 4.2 are connected to Master Horns Stack 4.1 in plurality and form the said second assembly 4 of the present automated device for degassing and/or foaming of molten metal and alloys P. Said second assembly 4 is connected to said booster 3.5 through Guide bush and boss 3.7. Said second assembly 4 along with booster 3.5 is further assembled with said converter 3.4. Said split tips slave horns stacks 4.2 are provided with split tips which can be replaced easily once worn out. Due to the provision of the plurality of split tip slave horns stacks 4.2 the user doesn't need to change the entire master slave horn stacks and only needs to replace the tips of the slave horn stacks, thus being substantially efficient, user friendly and economical. The Bottom of the Split slave horn stack 4.3.5 is connected to the Top of Split Slave Horns Stack 4.3.3 through the Connection to the bottom of split Slave horns stack 4.3.4. Said Top of Split Slave Horns Stack 4.3.3 consists of catenoidal exponential mixed stepped profile of slave horns stack 4.3.2 and is provided to release the stress of said split tip slave horns stack 4.2. Connector to booster and master horns stack 4.3.7 is provided to facilitate the mechanical connection between said booster 3.5 and master horns stack 4.1 for efficient transmission of the sonic waves with set higher frequency along with set amplitude. Connector to master horn stack and split tip slave horn stack 4.3.8 is provided to facilitate the mechanical connection between said master horns stack 4.1 and split tip slave horns stack 4.2 for efficient transmission of the sonic waves with set higher frequency along with set amplitude. Said connector to master horn stack and split tip slave horn stack 4.3.8 is connected to master horns stack 4.1 on one side and to split tip slave horns stack 4.2 on other side. Connector to split tip slave horns stack 4.3.9 is connected to the top of split slave horns stack 4.3.3 on one side and on the other side is connected to the bottom of split slave horn stack 4.3.5.

Referring to FIG. 5, Third assembly 5 is provided for the treatment and flow of the molten metal and their alloy. Said third assembly 5 is connected to fourth assembly 6 of the present device P as shown in FIG. 7 and FIG. 9. Said third assembly 5 further comprises:

Launder body 5.1,
Refractory lining 5.2,
Inlet 5.3,
Outlet 5.4, and
Direction of flow of molten metals and their alloys 5.5.

The Launder body 5.1 and refractory lining 5.2 are provided to facilitate the flow of molten metals and their alloys. The flow of molten metals and their alloys flows in from the Inlet 5.3. The flow of the molten metal alloys in the said launder body 5.1 and refractory lining 5.2 flows in the direction from the inlet 5.3 towards the outlet 5.4 and is referred in FIG. 5 as Flow of molten metal and their alloys 5.5.

Referring to FIG. 6, a Fourth assembly 6 is provided to facilitate the up-down motion of the converter 3.4, booster 3.5, and Second assembly 4. Said fourth assembly 6 is connected to the controller 2 on one side and on the other side is connected to each of the first assembly 3, second assembly 4 and third assembly 5 as shown in FIG. 8 and FIG. 9. Said fourth assembly 6 further comprises:

Structural assembly 6.1,
Actuator with water cooled guide 6.2
Arm 6.3, and
Spring with guide 6.4;
Wherein:
Structural assembly 6.1 provides the structural support to the first assembly 3 and second assembly 4 and facilitates the up-down movement of the arm for up-down motion 6.3. Water cooled guide with actuator for up-down motion 6.2 facilitates the linear up-down movement of the converter 3.4, booster 3.5, and Second assembly 4. The actuator with Water cooled guide 6.2 is provided for up-down linear motion of converter 3.4, booster 3.5, and Second assembly 4 up-down and is controlled by the said controller 2. Said actuator with Water cooled guide 6.2 facilitates the insertion of converter 3.4, booster 3.5, and Second assembly 4 into said launder body 5.1 and establishes the contact between the said Second assembly 4 and flow of molten metal alloys 5.5. The actuator with water cooled guide 6.2, cools the said forth assembly 6. Said fourth assembly 6 is mounted on the third assembly 5 as shown in FIG. 7. Further said first assembly 3 and second assembly 4 are mounted on the structural assembly 6.1 through mechanical joints as shown in FIG. 7.

Process for the Present Invention

The present invention P, provides the controlled process for degassing and/or foaming of metals and their alloys through the formation of ultrasonic cavitation and thereby eliminates the use of harmful chemicals and injectable gases in the process of degassing and/or foaming of molten metal and their alloys; wherein the steps of the process using the present device comprises of:

1. Selecting the mode of operation of the present device and setting of required parameters.
2. Activating said first assembly 3, second assembly 4, third assembly 5 and fourth assembly 6 and facilitating the formation of ultrasonic cavitation in the molten metal and their alloys through the working of said assemblies.
3. Degassing of the molten metal and their alloys due to formation of micro bubbles.

Step 1: Selecting the Mode of Operation of the Present Device and Setting of Required Parameters.

Said controller 2 is activated by receiving the signal from TCP/IP and in turn activates the plurality of sonic generators 1. The user of the present device P further selects the mode of operation of the present device P (i.e. manual mode or automatic mode). The user further sets the frequency, amplitude, and time parameters through the Frequency setting switch 1.7, Amplitude setting Switch 1.8, and Time setting switch 1.9 of the said plurality of sonic generators 1. The said plurality of sonic generators 1 as per the set frequency, amplitude, and time, by the user generates the sonic waves at said preset parameters controlled by the said controller 2 that generates ultrasonic cavitation within the molten metal and their alloys. The present invention P is applicable to the wide range of molten metal and their alloys that includes but does not limit to Aluminuim (Al), Copper (Cu), Zinc (Zn), Magnesium (Mg), Iron (Fe) and alike. Table 1 shows the working range of parameters for the metal and their alloys following which the said plurality of sonic generators 1 generates the sonic waves for the degassing and/or foaming of molten metal and their alloys.

TABLE 1 working range of parameters for degassing and/or foaming of molten metals and their alloys.

| Metal/Alloy | Power (Watt) | Frequency (Hertz) | Temperature (° C.) | Amplitude (micron Pk to Pk) | Time (minutes) |
|---|---|---|---|---|---|
| Al | UP TO 12000 | 17000 TO 35000 | 690 TO 750 | 25 TO 85 | 1 TO 9 |
| Cu | UP TO 10000 | 20000 TO 35000 | 1080 TO 1125 | 25 TO 85 | 1 TO 10 |
| Zn | UP TO 10000 | 10000 TO 25000 | 400 TO 450 | 25 TO 85 | 1 TO 10 |
| Mg | UP TO 12000 | 15000 TO 22000 | 650 TO 680 | 25 TO 85 | 1 TO 10 |
| Fe | UP TO 15000 | 85000 TO 110000 | 1530 TO 1650 | 25 TO 85 | 1 TO 8 |

Step: 2 Activating Said First Assembly 3, Second Assembly 4, Third Assembly 5 and Fourth Assembly 6 and Thereby Facilitating the Formation of Ultrasonic Cavitation in the Molten Metal and their Alloys Through the Working of Said Assemblies Selecting the parameters according to the metal and their alloys, said controller 2 activates the first assembly 3, second assembly 4, third assembly 5 and fourth assembly 6. Further the flow of molten metal and their alloy flows in through said inlet 5.3. Controller 2 activates the actuators of said Water cooled guide with actuator for up-down motion 6.2. Said actuators in turn leads to the up-down linear motion of said converter 3.4, booster 3.5 and second assembly 4. The linear up-down motion of the converter 3.4, booster 3.5 and second assembly 4 establishes the contact between the flow of molten metal alloys in the said launder body 5.1, refractory lining 5.2 and converter 3.4, booster 3.5 and second assembly 4. The sonic frequencies generated by the said plurality of sonic generators 1 according to the preset controlled values for the treatment of the molten metal and their alloys leads to the formation of the ultrasonic cavitation in the molten metal and their alloys. Said process is carried out without using any injectable gases and chemicals and is also carried out at reduced atmospheric pressure conditions. The formation of ultra-sonic cavitation facilitates the degassing and/or foaming of molten metal and their alloys.

Step: 3 Degassing of the Molten Metal and their Alloys Through Formation of Micro Bubbles.

Due to the said ultrasonic cavitation in the flow of molten metal and their alloys 5.5 micro bubbles with diameter of 1 micron to 10000 micron are formed. Said micro bubbles further facilitates the formation of nuclei which is formed due to dissolved gases and air into a medium of a cavity, which further flows out of the melt and thereby facilitates degasification of molten metals and their alloys without the use of any injectable gases and harmful chemicals and thereby the present invention provides an efficient, eco-friendly device and process for degassing and/foaming of molten metal and their alloys.

Working of the Invention

Referring to FIG. 10, the present automated device P is turned on, which in turn switches on the said controller 2. Said controller 2 sends the signal and activates the plurality of sonic generators 1. In case the body of the said sonic generator 1 is opened by the unauthorized user then the said controller 2 turns "ON" the said kill switch with TCP/IP communication port 2.2 and alerts the authorized user of the discrepancy caused by the use of the unauthorized user. Further the user of the said plurality of sonic generators 1 selects the mode of operation of the present device P (i.e. the manual mode or automatic mode). In case the user selects the manual mode of operation of the present device, the user further sets the frequency, amplitude, and time parameters through the Frequency setting switch 1.7, Amplitude setting Switch 1.8, and Time setting switch 1.9 of the said plurality of sonic generators 1. On setting the required parameters for degassing and/or foaming of metals and their alloys, the sonic treatment of the molten metal flowing in the launder body 5.1 starts. Said treatment continues with continuous cooling and manual up-down linear motion of said Second assembly 4. The sonic treatment of the molten metal and their alloys in "ON" until the controller 2 sends the "stop" signal. In case of automatic mode of operation of the present device P, the user initially sets the parameters such as frequency, amplitude, and time for different metals and alloys through said Frequency setting switch 1.7, Amplitude setting Switch 1.8, and Time setting switch 1.9. Said plurality of sonic generators 1 based on the parameters of frequency, amplitude and time set by the user sends the signals to the controller 2 for the controlled generation of the sonic frequencies, and amplitude for a controlled time period as set by the user. The Controller 2 further activates the said assemblies including first assembly 3, second assembly 4, third assembly 5, and fourth assembly 6. Further the flow of molten metal and their alloy flows in through said inlet 5.3. Controller 2 activates the actuators of said Water cooled guide with actuator for up-down motion 6.2. Said actuators in turn leads to the up-down linear motion of said converter 3.4, booster 3.5 and second assembly 4. The linear up-down motion of the converter 3.4, booster 3.5 and second assembly 4 establishes the contact between the flow of molten metal alloys in the said launder body 5.1, refractory lining 5.2 and converter 3.4, booster 3.5 and second assembly 4. The sonic frequencies are generated by the said plurality of sonic generators 1 according to the preset controlled values for the treatment of the molten metal and their alloys. The sonic treatment of the molten metal and their alloys is "ON" until the controller 2 sends the "stop" signal.

Further, the present automated device for degassing and/or foaming of molten metals and their alloys P, facilitates controlled degassing and/or foaming of molten metals and their alloys and thereby increases the tensile strength, impact strength, hardness, grain refinement, malleability, corrosion resistance, and conductivity of metals and their alloys. The experimental data of the metal and their alloys treated through the present automated device for degassing and/or foaming of molten metals and their alloys P, showing the increased tensile strength, impact strength, hardness, grain refinement compared to the ASTM standards are enlisted herein below.

1. Tensile Strength Test:

Tensile strength is the ability of the metal to withstand tensile force. The tensile strengths of metal and their alloys are decided as per the ASTM standards. The present device P provides the metal with increased tensile strength as shown in Table 2 and thereby increases the shelf life and durability of the metal and their alloys and thus is efficient.

TABLE 2

Tensile Strength test data

| Metal/ Alloy | Test Method | Sample Details | Area (mm2) | Gauge Length (mm) | Ultimate Load (KN) | Ultimate tensile strength (N/mm2) |
|---|---|---|---|---|---|---|
| Aluminuim Com. Grade | ASTM B-557 | M-1 | 125.086 | 50 | 11.446 | 91.617 |
| Aluminuim Com. Grade | ASTM B-557 | M-3(1) | 123.112 | 50 | 9.94 | 80.74 |
| Aluminuim Com. Grade | ASTM B-557 | US-1 | 124.69 | 50 | 12.06 | 96.72 |
| Aluminuim Com. Grade | ASTM B-557 | US-3 | 125.682 | 50 | 12 | 95.479 |

Referring to table 2, the samples named as US-1 and US-3 are treated using the present device P whereas the samples named as while M-1 and M-3(1) are treated using prior art. It is evident from the test result data measured using destructive testing as per ASTM B-557 standards, that the samples treated using the present device P shows 5.57% of increase in tensile strength in case of US-1 as compared with the M-1 test sample and shows 18.25% increment in case of US-3 as compared with M-3(1).

2. Impact Strength Test:

Resistance of a metal to impacts is evaluated in terms of impact strength. The impact strength of a metal is determined by measuring the energy absorbed in the fracture. The present automated device for degassing and/or foaming of molten metals and their alloys P provides the metal with increased impact strength as shown in Table 3 and thereby increases the strength, and ductility of the metal and their alloys and thus is efficient.

TABLE 3

Impact Strength Test data:

| Metal/ Alloy | Test Method | Sample Details | Dimension | Tempreature (° C.) | R (J) | | |
|---|---|---|---|---|---|---|---|
| | | | | | R1 | R2 | R3 |
| Aluminuim | ASTM A216: 2014 | M-2 | 10*10 | Room temp | 18 | 16 | 14 |
| | | Average | | | | | 16 |
| Aluminuim Com. Grade | ASTM A216: 2014 | US-2 | 10*10 | Room Temp | 17 | 16 | 16 |
| | | Average | | | | | 16.33 |

Referring to Table 3, the samples named as US-2 are treated using the present device P whereas the samples named as M-2 are treated using prior art. It is evident from the test result data measured using destructive testing as per ASTM A216:2014 standards, that the samples treated using the present device P shows 2.06% of increase in impact strength in case of US-2 as compared with the M-2 test sample.

3. Hardness Test

The present automated device for degassing and/or foaming of molten metals and their alloys P provides the metal with increased impact strength as shown in Table 4 and thereby increases the strength, and resistance of the metal and their alloys and thereby increases the shelf life of the metal thus being efficient and effective.

TABLE 4 hardness test data

| Metal/ Alloy | Test Method | Sample Details | Hardness (HV) | | |
|---|---|---|---|---|---|
| Aluminuim Base | Micro Vickers Hardness Test | US | 23.4 | 23.2 | 20.7 |
| | Average | | | | 22.4 |
| Aluminuim Base | Micro Vickers Hardness Test | M | 19.6 | 20.9 | 20.0 |
| | Average | | | | 20.2 |

Referring to Table 4, the samples named as US are treated using the present device P whereas the samples named as M are treated using prior art. It is evident from the test result data measured using Micro Vickers Hardness Testing, that the samples treated using the present device P shows 10.89°, of increase in hardness in case of US as compared with the M test sample.

4. Grain Size Measurement:

The present automated device for degassing and/or foaming of molten metals and their alloys P provides the metal with equi-axial grain distribution, grain size, and grain refinement as shown in Table 5 and thereby provides strength as well as consistent and uniform properties such as tensile strength, impact strength, and hardness to the metal and their alloys.

TABLE 5

Grain Size Measurement test data

| Metal/ Alloy | Test Method | Sample Details | Avg. Intercept no | Avg. Diameter (micron) | Avg. Grain Area (micron2) | Avg. Grain no |
|---|---|---|---|---|---|---|
| Au Com. Grade | ASTM E-112 | US1 | 34.4 | 13 | 215 | 9 |
| | | US2 | 36.2 | 13 | 215 | 9 |
| | | US3 | 40.4 | 10.95 | 152 | 9 |
| Au Com. Grade | ASTM E-112 | M1 | 31.3 | 15.45 | 304 | 8 |
| | | M2 | 32.9 | 15.45 | 304 | 8 |
| | | M3 | 37.8 | 13 | 215 | 9 |

Referring to Table 4, the samples named as US1, US2 and US3 are treated using the present device P whereas the samples named as M1, M2, M3 are treated using prior art. It is evident from the test result data measured using microscopic testing as per ASTM E-112 standards, that the samples treated using the present device P shows 15.85% of increased refinement of grains in case of US1 and US2 as compared with the M1 and M2 test samples and 15.76% increased refinement of grains in case of US3 as compared with the M3 test sample.

We have drawn the overall comparison table of the properties of the metals and their alloys treated through the present automated device for degassing and/or foaming of molten metals and their alloys P and the metals treated by the other inventions.

TABLE 6

Comparative table

| Test Type | Unit | Test Standard | Present Invention | Others |
|---|---|---|---|---|
| Tensile Strength | N/mm² | ASTM B-557 | 96.0995 | 86.1785 |
| Impact Strength | J | ASTM A-216:2014 | 16.33 | 16 |
| Hardness | HV | MICRO VICKERS | 22.4 | 20.2 |
| Grain Diameter | MICRON | ASTM E-112 | 12.3166 | 14.6333 |
| Hydrogen Content | cc/100 gm | NA | <0.12 | <0.2 |

It is evident from Table 6, the comparative table, that the instant invention is efficient and effective in many aspects over the prior art. The prior art does not provide an effective and efficient increase in metal properties such as tensile strength, impact strength, hardness, grain size, and grain refinement, and thus the prior art also fails to provide increased shelf life and durability of the metal and their alloys.

The present invention for which the protection is sought provides an automated device for degassing and/or foaming of molten metal and their alloys, wherein the metal and their alloys treated with the present invention show increased tensile strength, impact strength, hardness, grain refinement, malleability, corrosion resistance, and conductivity of metals and their alloys and also provides an automated device for continuous degassing and/or foaming of the molten metal and their alloys. Further the present invention eliminates the use of harmful chemicals and injectable gasses for degassing and/or foaming of molten metal and their alloys and thereby is ecofriendly and effective. Furthermore, the present invention utilizes less power and provides continuous degassing and/or foaming of molten metal and their alloys and thus is energy efficient, cost effective, ecofriendly and efficient.

Having described what is considered the best form presently contemplated for embodying the present invention, various alterations, modifications, and/or alternative applications of the invention for any system will be promptly apparent to those skilled in the art. Therefore, it is to be understood that the present invention is not limited to the practical aspects of the actual preferred embodiments hereby described and that any such modifications and variations must be considered as being within the spirit and the scope of the invention, as described in the above description.

The invention claimed is:

1. An automated device for degassing and/or foaming of metal and their alloys P, wherein the automated device comprises:
   A Plurality of Sonic Generators 1,
   Controller 2,
   First Assembly 3,
   Second Assembly 4,
   Third Assembly 5, and
   Fourth Assembly 6;
wherein:
a given sonic generator out of said plurality of sonic generators 1 is connected to the controller 2 at one side and is connected to the First assembly 3, second assembly 4 and third assembly 5 on the other side of the automated device P; said given sonic generator 1 further comprises:
   Cooling Fins 1.1,
   Cooling Fan 1.2,
   Capacitor and resistor Array 1.3,
   Frequency transformers 1.4,
   Logic Gates array 1.5,
   Kill switch 1.6,
   Frequency setting switch 1.7,
   Amplitude setting Switch 1.8,
   Time setting switch 1.9, and
   Display 1.10;
Wherein:
said Cooling Fins 1.1 and Cooling fans 1.2 are provided for cooling of said given sonic generator 1, said Frequency setting switch 1.7, Amplitude setting Switch 1.8 and Time setting switch 1.9 are provided to set the frequency, amplitude and time of the sonic waves generated; further values of the frequency, amplitude and time are displayed on the display 1.10 of the given sonic Generator 1; Capacitor and resistor Array 1.3, and Logic Gates array 1.5 are made up of carbon, metal oxides; said given sonic generator 1 consists of physical protection; wherein said kill switch 1.6 automatically turns "on" when an unauthorized user tries to open the given sonic generator 1 and alerts an authorized user; said controller 2 is connected to the given sonic generator 1 on one side and to the said forth assembly 6 on the other side; and said controller 2 further comprises:
Connection to sonic Generator 2.1,
Kill switch TCP/IP communication port 2.2,
Connection to controller and Water Cooled Guide with Actuator for Up-Down Motion 2.3,
wherein:
said controller 2 is connected to the given sonic generator 1 through Connection to sonic Generator 2.1 by electrical and TCP/IP connections;
said first assembly 3 is connected to the given sonic generator 1 on one side and is connected to a fourth assembly 6 on the other side; said First assembly 3 is further comprises:
Connection to sonic generator through cable 3.1,
Multi pin Rose Connecter (Male/female) 3.2,
Multi Pin Rose Female connector 3.2.1,
Multi Pin Rose Male Connector 3.2.2,
Socket lock of multi Pin Rose Connector 3.3,
Converter 3.4,
Booster 3.5,
Socket lock with cooling arrangement 3.6,
Guide bush and boss 3.7
Piezo device 3.8.1,
Membrane 3.8.2,
Ceramic Spring 3.8.3,
Housing 3.8.4, and
Cap 3.8.5;
said first assembly 3 is connected to the given sonic generator 1 through the connection to sonic generator cable 3.1; The multi pin rose connecter (male/female) 3.2 further consists of multi pin rose female connector 3.2.1, multi pin rose male connector 3.2.2; said converter 3.4 is connected to the given sonic generator 1 on one side through said multi pin rose female connector 3.2.1 and connection to sonic generator cable 3.1 and is connected to booster 3.5 on other side; said converter 3.4 and booster 3.5 comprises piezo electric ceramic elements; said piezo device 3.8.1 is located inside said convertor 3.4 and booster 3.5; said housing 3.8.4 is a hollow thick cylinder of titanium alloy with cap 3.8.5 on top and bottom;
said second assembly 4 is sonic master slave horn stack assembly and is connected to said first assembly 3 on one side and is connected to the fourth assembly 6 on the other side; said second assembly further comprises:
Master Horns Stack 4.1,
Split Tip Slave Horns Stack 4.2,
Connection to Master Horn Stack 4.3.1,
Catenoidal exponential mixed stepped profile of slave horns stack 4.3.2,
Top of Split Slave Horns Stack 4.3.3,
Connection to bottom of split Slave horns stack 4.3.4,
Bottom of Split slave horn stack 4.3.5,
Connection to top of split slave horns stack 4.3.6,
Connector to booster and master horns stack 4.3.7,
Connector to master horn stack and split slave horn stack 4.3.8, and
Connector to split tip slave horns stack 4.3.9;
said Split Tip slave Horns Stack 4.2 are connected to Master Horns Stack 4.1 in plurality and forms the said second assembly 4; said second assembly 4 is connected to said booster 3.5 through Guide bush and boss 3.7; said second assembly 4 along with booster 3.5 is further assembled with said converter 3.4; further the Bottom of Split slave horn stack 4.3.5 is connected to the Top of Split Slave Horns Stack 4.3.3 through the Connection to bottom of split Slave horns stack 4.3.4; said Top of Split Slave Horns Stack 4.3.3 consists of catenoidal exponential mixed stepped profile of slave horns stack 4.3.2; said connector to master horn stack and split tip slave horn stack 4.3.8 is connected to master horns stack 4.1 on one side and to split tip slave horns stack 4.2 on other side; Connector to split tip slave horns stack 4.3.9 is connected to top of split slave horns stack 4.3.3 on one side and on the other side is connected to the bottom of split slave horn stack 4.3.5;
said third assembly 5 is connected fourth assembly 6; said third assembly 5 further comprises:
Launder body 5.1,
Refractory lining 5.2,
Inlet 5.3,
Outlet 5.4, and
Direction of flow of molten metals and their alloys 5.5;
wherein the flow of molten metals and their alloys flows in from the Inlet 5.3; the flow of the molten metal alloys in the said launder body 5.1 and refractory lining 5.2 flows in the direction from the inlet 5.3 towards the outlet 5.4;
said fourth assembly 6 is connected to the controller 2 on one side and on the other side is connected to each of the first assembly 3, second assembly 4 and third assembly 5; said fourth assembly 6 further comprises:
Structural assembly 6.1,
Actuator with water cooled guide 6.2
Arm 6.3, and
Spring with guide 6.4;
Wherein:
structural assembly 6.1 facilitates up-down movement of the arm for up-down motion 6.3; said Water cooled guide with actuator for up-down motion 6.2 facilitates the linear up-down movement of the converter 3.4, booster 3.5, and Second assembly 4; said actuator with Water cooled guide 6.2 facilitates the insertion of converter 3.4, booster 3.5, and Second assembly 4 into said launder body 5.1 and establishes the contact between the said Second assembly 4 and flow of molten metal alloys 5.5; said fourth assembly 6 is mounted on the third assembly 5; further said first assembly 3 and second assembly 4 are mounted on the structural assembly 6.1.

2. A process for degassing and/or foaming of metal and their alloys P, using the automated device as claimed in claim 1, comprising:
1. Selecting a mode of operation of the automated device P and setting parameters;
2. Activating said first assembly 3, second assembly 4, third assembly 5 and fourth assembly 6 and facilitating the Formation of ultrasonic cavitation in the molten metal and their alloys through the working of said assemblies;
3. Degassing of the molten metal and their alloys due to formation of micro bubbles.

3. The automated device for degassing and/or foaming of metal and their alloys P, as claimed in claim 1, wherein the degasification of metal and their alloys is through the formation of ultrasonic cavitation caused by linear up-down motion of the said converter 3.4, booster 3.5, and Second assembly 4.

4. The process for degassing and/or foaming of metal and their alloys P, as claimed in claim 2, wherein the degasification of metal and their alloys is through the formation of ultrasonic cavitation caused by linear up-down motion of the said converter 3.4, booster 3.5, and Second assembly 4.

\* \* \* \* \*